(12) United States Patent
Mitchell et al.

(10) Patent No.: US 8,534,035 B1
(45) Date of Patent: Sep. 17, 2013

(54) HIGH-THROUGHPUT VACUUM COTTON HARVESTER

(75) Inventors: James F. Mitchell, Cleveland, MS (US); George L. Nunnery, Greenville, MS (US); Luke W. Carpenter, Lubbock, TX (US); Richard H. Sheetz, Plainview, TX (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 13/591,984

(22) Filed: Aug. 22, 2012

Related U.S. Application Data (60) Provisional application No. 61/529,964, filed on Sep. 1, 2011.

(51) Int. Cl.
*A01D 46/00* (2006.01)

(52) U.S. Cl.
USPC .......................................................... 56/13.1

(58) Field of Classification Search
USPC ............... 56/13.1, 12.9, 12.8, 13.2, 328.1, 56/30, 31
See application file for complete search history.

(56) References Cited

U.S. PATENT DOCUMENTS

| | | | | |
|---|---|---|---|---|
| RE15,855 E | * | 6/1924 | Stukenborg | 56/13.2 |
| RE16,055 E | * | 4/1925 | Schofield | 55/297 |
| 1,558,716 A | * | 10/1925 | Stukenborg | 56/12.4 |
| 1,578,224 A | * | 3/1926 | West | 56/12.5 |
| 1,624,308 A | * | 4/1927 | Brown | 406/39 |
| 1,684,981 A | * | 9/1928 | White | 56/32 |
| 1,691,146 A | * | 11/1928 | Boggs | 56/32 |
| 1,702,508 A | * | 2/1929 | Herrmann | 56/32 |
| 1,750,541 A | * | 3/1930 | Preston | 56/13.1 |
| 1,751,376 A | * | 3/1930 | Watkins | 406/39 |
| 1,763,480 A | * | 6/1930 | Rice | 56/13.1 |
| 1,807,751 A | * | 6/1931 | Post | 56/13.1 |
| 1,828,581 A | * | 10/1931 | Watson | 56/32 |
| 1,889,580 A | * | 11/1932 | Willett et al. | 280/92 |
| 1,941,124 A | * | 12/1933 | Ziegler | 209/136 |
| 1,971,349 A | * | 8/1934 | Koon | 56/13.1 |
| 2,204,092 A | * | 6/1940 | Luhn | 56/37 |
| 2,308,357 A | * | 1/1943 | Costa | 56/30 |
| 2,531,041 A | * | 11/1950 | Henry | 56/13.1 |
| 2,680,338 A | * | 6/1954 | Space | 56/13.1 |
| 2,736,151 A | * | 2/1956 | McKenzie | 56/13.1 |
| 2,785,522 A | * | 3/1957 | McKenzie | 56/31 |
| 3,127,036 A | * | 3/1964 | Cunningham et al. | 406/39 |

(Continued)

FOREIGN PATENT DOCUMENTS

| | | | |
|---|---|---|---|
| CN | 200997780 Y | * | 1/2008 |
| IN | 197896 | | 8/2007 |

*Primary Examiner* — Árpád Fábián-Kovács
(74) *Attorney, Agent, or Firm* — Polster Lieder Woodruff & Lucchesi, LC (57) ABSTRACT

A high through-put cotton harvesting system for selectively harvesting cotton from a plurality of selected cotton plants in a field, wherein the system includes a self-propelled mobile platform that is structured and operable to be driven through a field of cotton, and a compressor disposed on the mobile platform. The system additionally includes a plurality of plant picker assemblies that are extendable from the mobile platform. Each plant picker assembly is structured and independently operable to utilize a vacuum force, generated via the compressor, to extract cotton bolls from one or more cotton plants growing in the field as the mobile platform is driven through the field and deposit the extracted cotton bolls into a selected collection receptacle.

17 Claims, 11 Drawing Sheets

(56) References Cited

U.S. PATENT DOCUMENTS

| | | | |
|---|---|---|---|
| 3,460,330 A * | 8/1969 | Black, Jr. | 56/328.1 |
| 3,619,994 A * | 11/1971 | Rohde | 56/13.1 |
| 3,813,857 A * | 6/1974 | Harrington | 56/13.1 |
| 3,969,878 A * | 7/1976 | Morganeier | 56/328.1 |
| 7,540,137 B2 * | 6/2009 | Gray | 56/328.1 |
| 7,810,305 B2 * | 10/2010 | Macidull | 56/334 |
| 2011/0047951 A1 * | 3/2011 | Moore | 56/234 |
| 2012/0096823 A1 * | 4/2012 | Moore | 56/10.1 |

* cited by examiner

HIGH-THROUGHPUT VACUUM COTTON HARVESTER

CROSS-REFERENCE TO RELATED APPLICATIONS

This application claims the benefit of U.S. Provisional Application No. 61/529,964, filed on Sep. 1, 2011. The disclosure of the above application is incorporated herein by reference in its entirety.

FIELD

The present teachings relate to systems and method for harvesting cotton simultaneously from a plurality of cotton plants at a high-throughput rate.

BACKGROUND

The statements in this section merely provide background information related to the present disclosure and may not constitute prior art.

Picking cotton by hand is notoriously laborious, time consuming, and fraught with ergonomic and safety concerns. Collectors must stoop to pick bolls (as used herein bolls is defined as the cotton lint including the seed) from plants and constantly contend with sharp dry spines that cut the skin. When harvesting cotton in a research setting, it is often important to collect all bolls from a cotton plant. Because of the ergonomic and safety concerns, collectors tend to skip over those bolls located on the plant in areas that are hard to reach or not immediately visible. Thus, seeds from the bolls collected by hand may not uniformly represent the genetics of the population leading to spurious data and false conclusions.

SUMMARY

A high through-put cotton harvesting system for selectively harvesting cotton from a plurality of selected cotton plants in a field, wherein the system includes a self-propelled mobile platform that is structured and operable to be driven through a field of cotton, and a compressor disposed on the mobile platform. The system additionally includes a plurality of plant picker assemblies that are extendable from the mobile platform. Each plant picker assembly is structured and independently operable to utilize a vacuum force, generated via the compressor, to extract cotton bolls from one or more cotton plants growing in the field as the mobile platform is driven through the field and deposit the extracted cotton bolls into a selected collection receptacle.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

The present disclosure provides an automated, self-propelled cotton harvesting system 10 for selectively harvesting cotton bolls simultaneously from a plurality of cotton plants at a high-throughput rate. As used throughout herein, the term cotton bolls will be understood to mean the cotton lint having the respective cotton seed remaining intact and viable within the lint. More particularly, the seeds are not damaged or destroyed during collection, such that the seeds are viable and suitable for use by researchers to conduct genetic research. Therefore researchers can extract intact seeds from the bolls for testing, i.e., analysis for a chemical, genetic, or other desired trait. Additionally, as used herein, the phrase "selectively harvesting" will be understood to mean harvesting selected cotton bolls from selected plants within a field, i.e., one or more cotton bolls from one or more particular plants within an area of such a research plot, then identifying and tracking substantially every harvested cotton boll such that the genetic identity of each boll and respective seed can be traced back to the corresponding plant in the field or research plot.

The system 10 is a high-throughput system for collecting cotton bolls that uses a vacuum provided to or at multiple collection points. The multi-faceted system has different capacity levels depending on the collection objectives of the team of operators, i.e., users or collectors, utilizing the system 10. More specifically, operators can choose between different picker assemblies depending on whether they wish to keep individual plant collections separate, or whether they wish to bulk samples from multiple plants.

Referring to FIGS. 1A, 1B, 1C and 6, generally, the system 10 includes a self-propelled mobile platform 14, e.g., a modified cotton picker or a tractor, and a plurality of picker assembly hangers 18 substantially evenly spaced along the length of and mounted to one or more hanger booms 20 that extend laterally from one or both sides of the mobile platform 14 and/or behind the mobile platform 14. The system 10 additionally includes a centralized vacuum generation source 22 and a plurality of independent plant picker assemblies 30 connectable to the centralized vacuum generation source 22 and suspended from the picker assembly hangers 18.

In various embodiments, the system 10 can further include a plurality of multiple plant picker assemblies 34 also connected to the centralized vacuum generation source 22 and suspended from the picker assembly hangers 18. In such embodiments, each one of the independent plant picker assemblies 30 and a corresponding one of the multiple plant picker assemblies 34 are associated with a respective one of the picker assembly hangers 18.

Figure 1A:
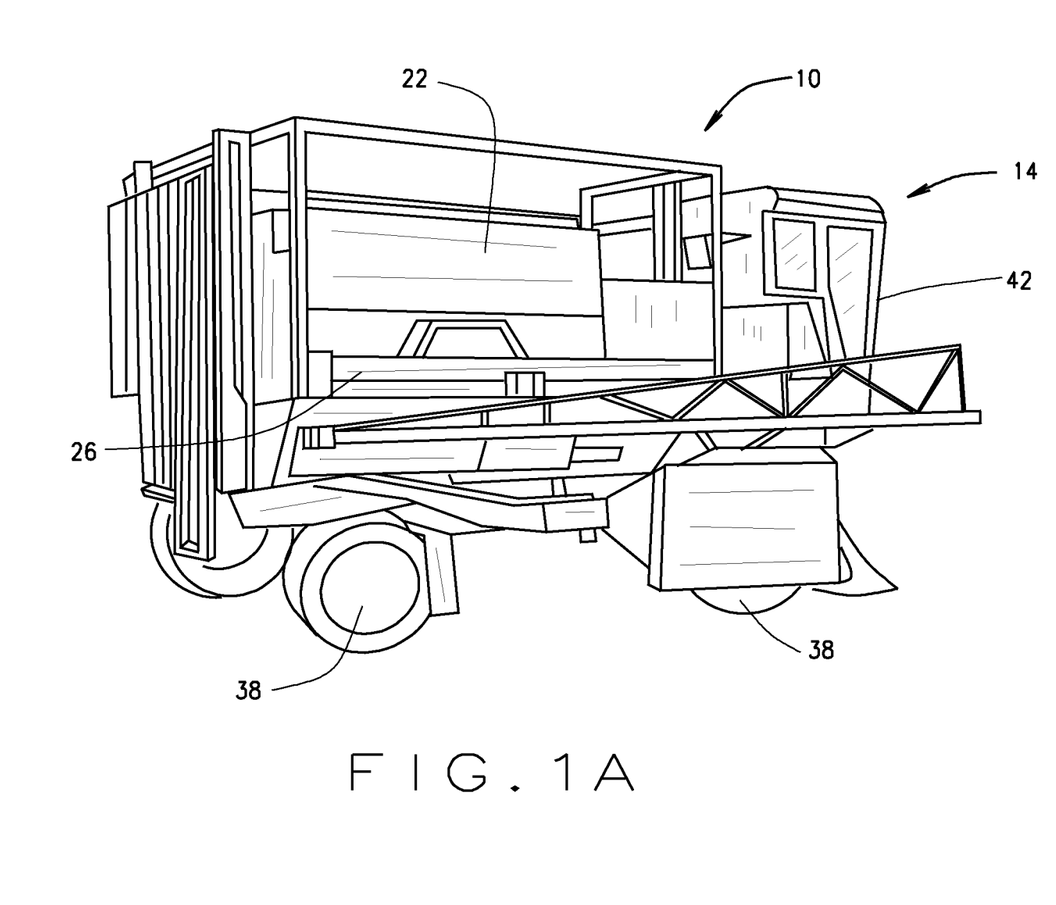
FIG. 1A is an illustration of an automated, self-propelled high-throughput vacuum cotton harvesting system for simultaneously harvesting cotton from a plurality of cotton plants, in accordance with various embodiments of the present disclosure.
Figure 1B:
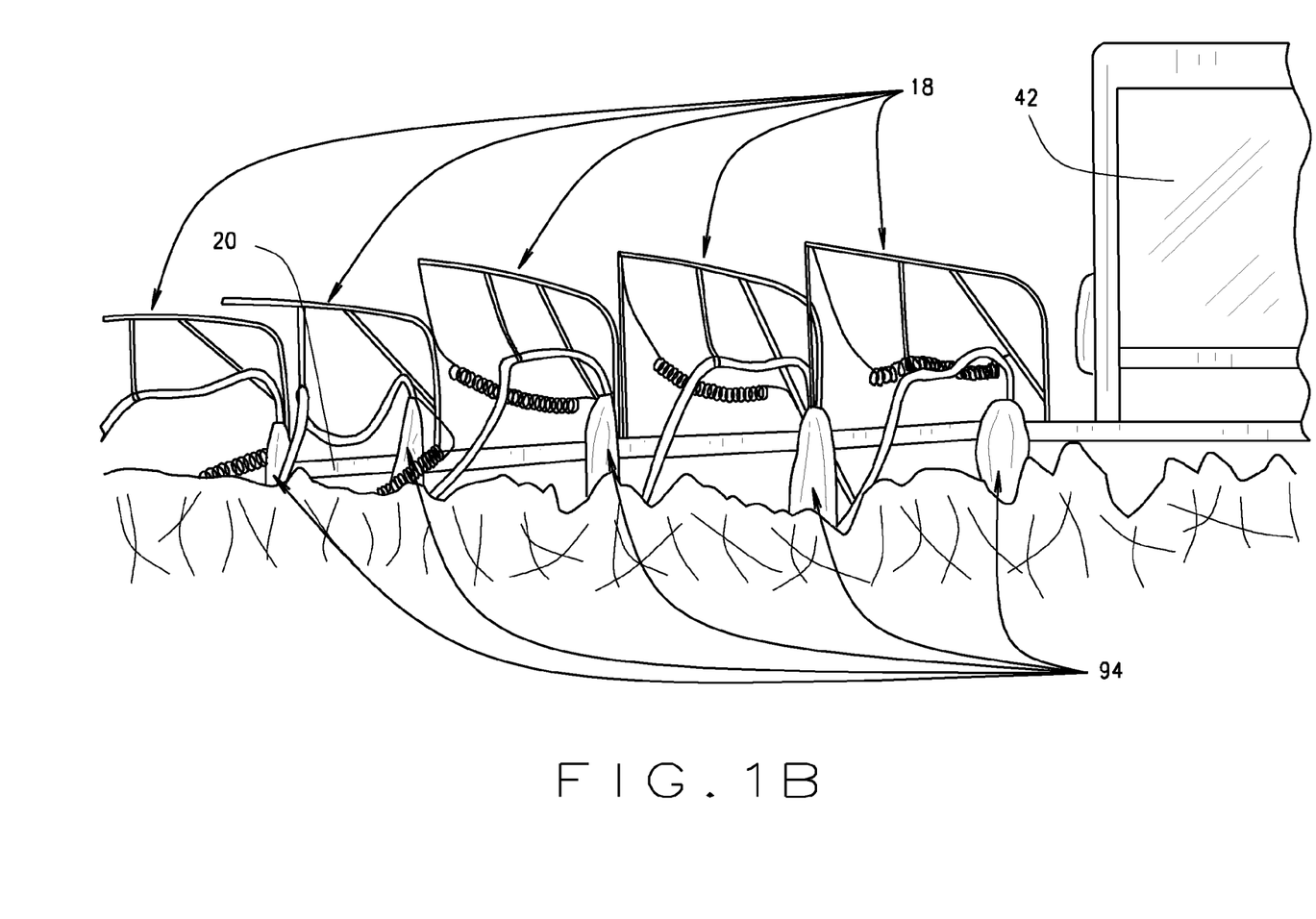
FIG. 1B is an illustration of one of a plurality of hanger booms of the high-throughput vacuum cotton harvesting system shown in FIG. 1A, in accordance with various embodiments of the present disclosure.
Figure 1C:
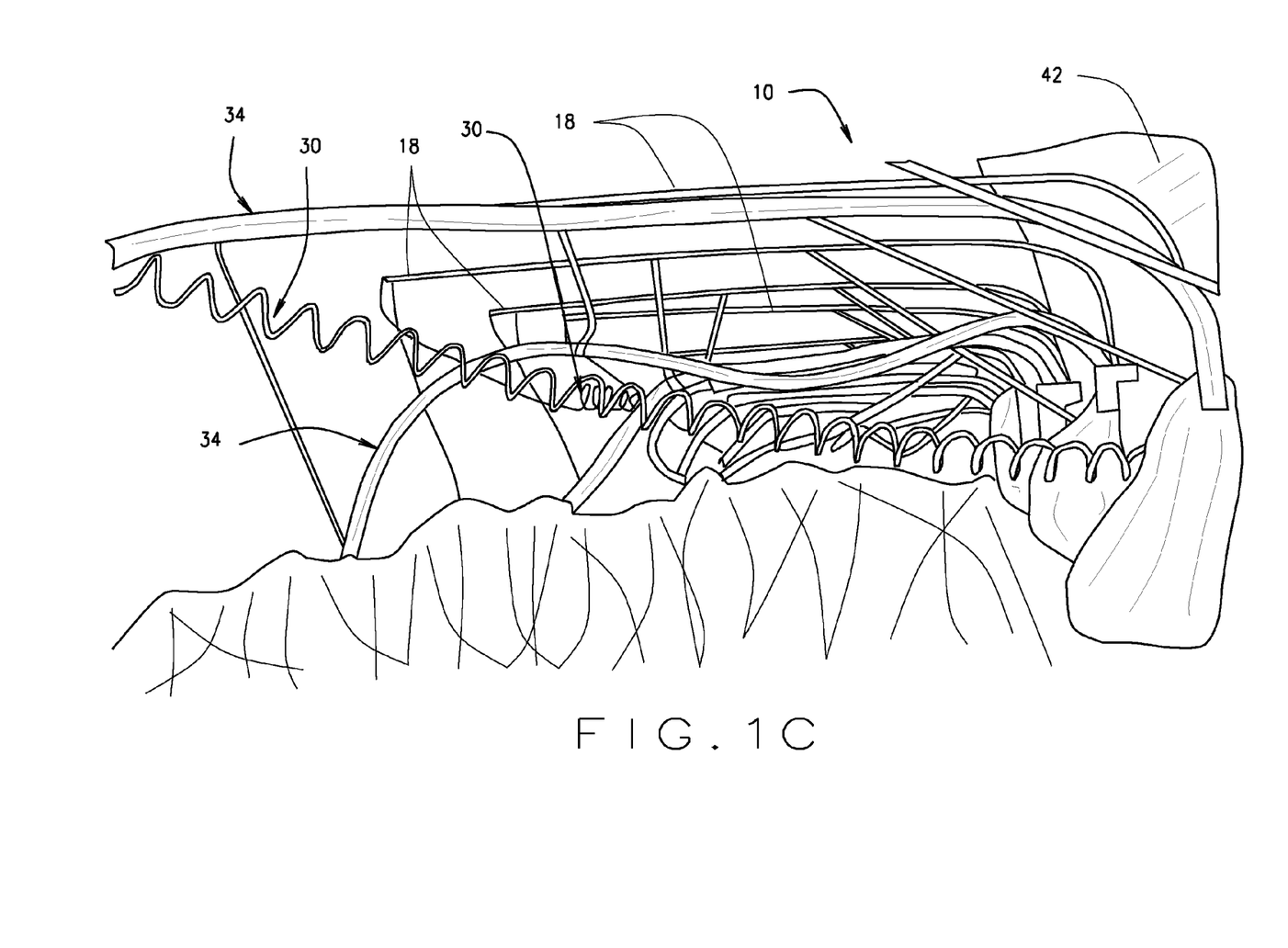
FIG. 1C is an illustration of a plurality of picker assembly hangers of the high-throughput vacuum cotton harvesting system shown in FIG. 1A mounted to the hanger booms shown in FIG. 1B, in accordance with various embodiments of the present disclosure.
Figure 6:
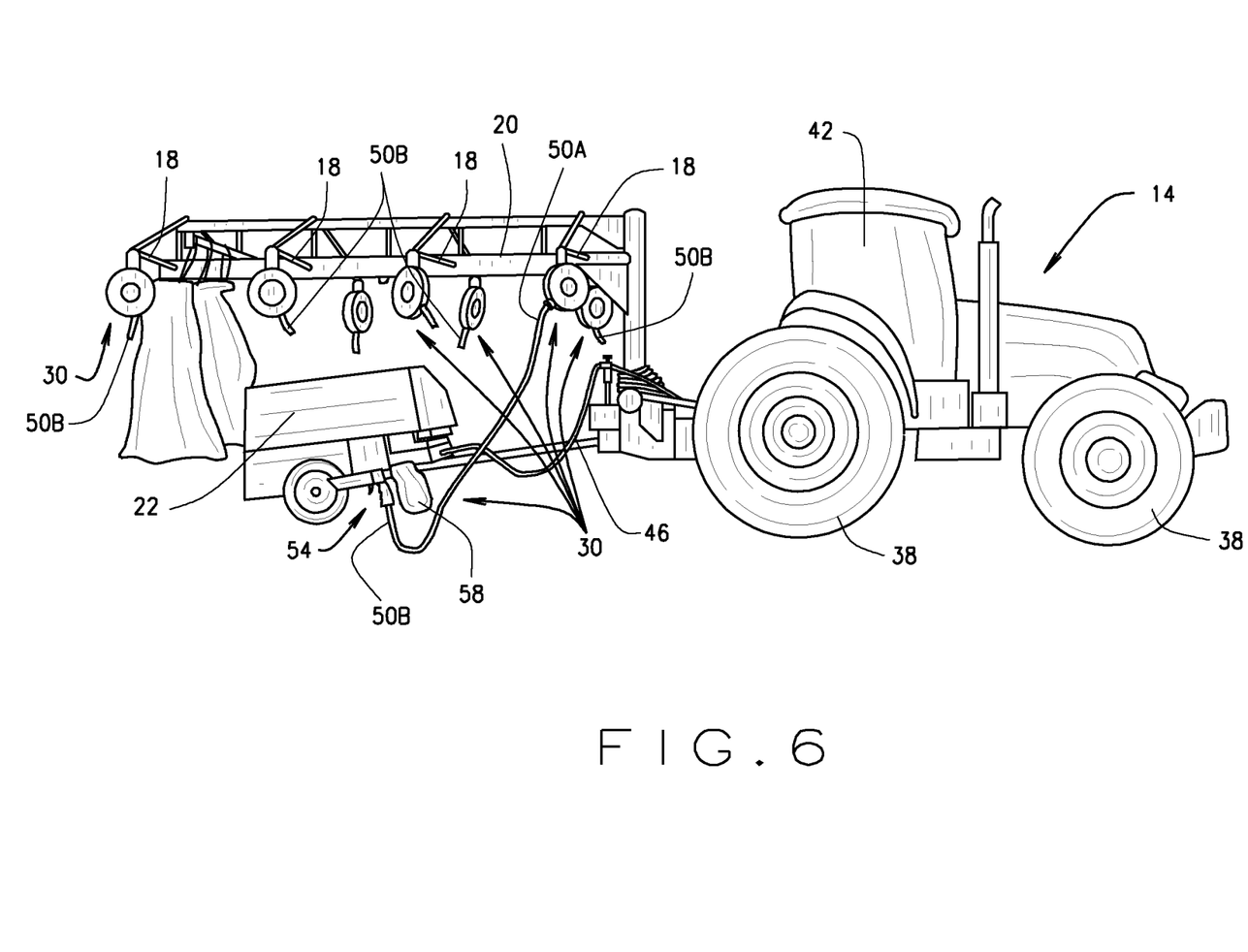
FIG. 6 is side view of the automated, self-propelled high-throughput vacuum cotton harvesting system shown in FIG. 1A, in accordance with various other embodiments of the present disclosure.

In various embodiments, the centralized vacuum generation source 22 can be mounted to a bed 26 of the mobile platform, as illustrated in FIG. 1A. Alternatively, in various embodiments, the centralized vacuum generation source 22 can be independent from the mobile platform 14. For example, in various embodiments the centralized vacuum generation source 22 can be mounted on a trailer that is pulled by the mobile platform 14, as illustrated in FIG. 6. What is important is that the entire system 10 is self-propelled. That is, in various embodiments, the hanger boom(s) 20, picker assembly hangers 18 and centralized vacuum generation source 22 can be mounted to the bed 26 and/or other structures of the mobile platform 14, which is self-propelled, as illustrated in FIGS. 1A through 1C. Or, in various other embodiments, the picker assembly hangers 18 can extend from one or more hanger booms 20 mounted to a support structure extending from a rear of the mobile platform 14 and the centralized vacuum generation source 22 can be mounted to a trailer that is connectable to a trailer hitch of the self-propelled mobile platform 14, as illustrated in FIG. 6.

The mobile platform 14 includes an engine and drivetrain (not shown) operable to rotate a plurality of wheels 38 to propel, i.e., impart movement on, the mobile platform 14 through a field of cotton and a cab 42 in which a driver can be positioned to operate the mobile platform 14 and the various components and assemblies thereof described herein, and to guide/steer and otherwise control movement of the mobile platform 14 through the field of cotton.

In various embodiments, the centralized vacuum generation source 22 can be a compressor and each of a main vacuum generation supply hose or cord 46 and a tether vacuum generation supply hose or cord 50, described below, can be an air hose, whereby compressed, or pressurized, air can be delivered from the centralized vacuum generation source 22 to a distal end 46B or 50B of each main or tether vacuum generation supply hose or cord 46 or 50. In various implementations of such embodiments, the centralized vacuum generation source 22 can be structured and operable to simultaneously deliver air to the distal ends 46B or 50B of each vacuum or tether generation supply hose or cord 46 or 50 at any desired pressure, e.g., 30 psi to 200 psi, whereafter one or more vacuum mechanisms 70, e.g., one or more venturi, of the respective picker gun 54 will generate a vacuum utilized by the respective picker gun 54 to remove, i.e., extract, cotton bolls from plant pods, as described below. Alternatively, in such embodiments, the centralized vacuum generation source 22 can include one or more vacuum mechanisms 70, e.g., one or more venturi, such that a centralized vacuum is generated at the centralized vacuum generation source 22 and delivered, via the main and tether vacuum generation supply hoses or cords 46 and 50 to each picker gun 54 to remove, i.e., extract, cotton bolls from plant pods, as described below.

In other embodiments, it is envisioned that the centralized vacuum generation source 22 can be an electrical generator and each main and tether vacuum generation supply hose or cord 46 can be an electrical cord suitable to carry electrical current generated by the centralized vacuum generation source 22 to each respective picker gun 54. In such embodiment, each picker gun 54 is structured and operable to utilize the electrical current to generate a vacuum utilized by each picker gun 54 to remove, i.e., extract, cotton bolls from plant pods, as described below.

Although the centralized vacuum generation source 22 can be an electrical generator and each main and tether vacuum generation supply hose or cord 46 and 50 can be an electrical cord, for simplicity and clarity, the centralized vacuum generation source 22 will be described below as a compressor and each main and tether vacuum generation supply hose or cord 46 and 50 will be described below as an air hose.

Figure 2A:
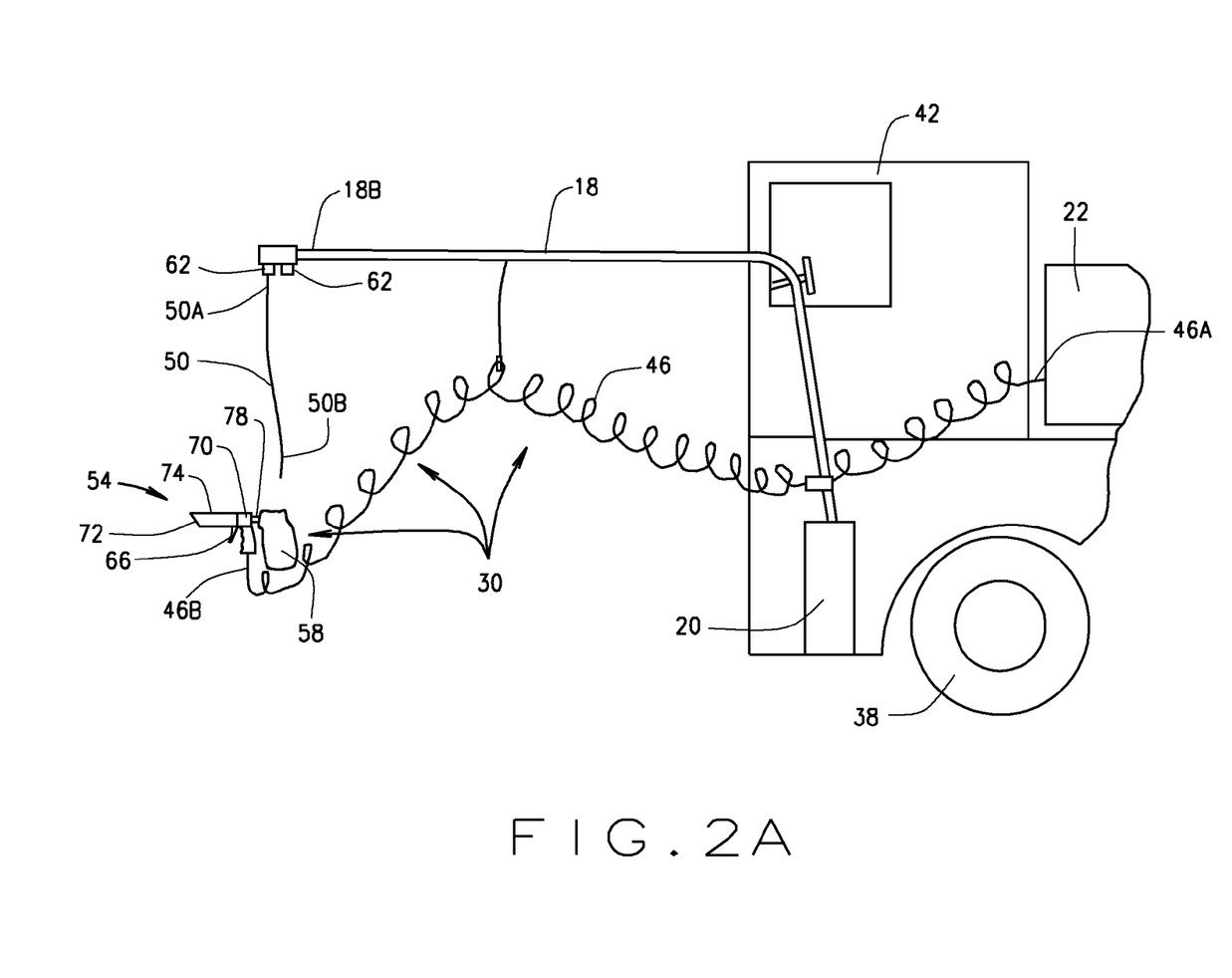
FIG. 2A is an illustration of an independent plant picker assembly of the high-throughput vacuum cotton harvesting system shown in FIG. 1A, in accordance with various embodiments of the present disclosure.
Figure 2B:
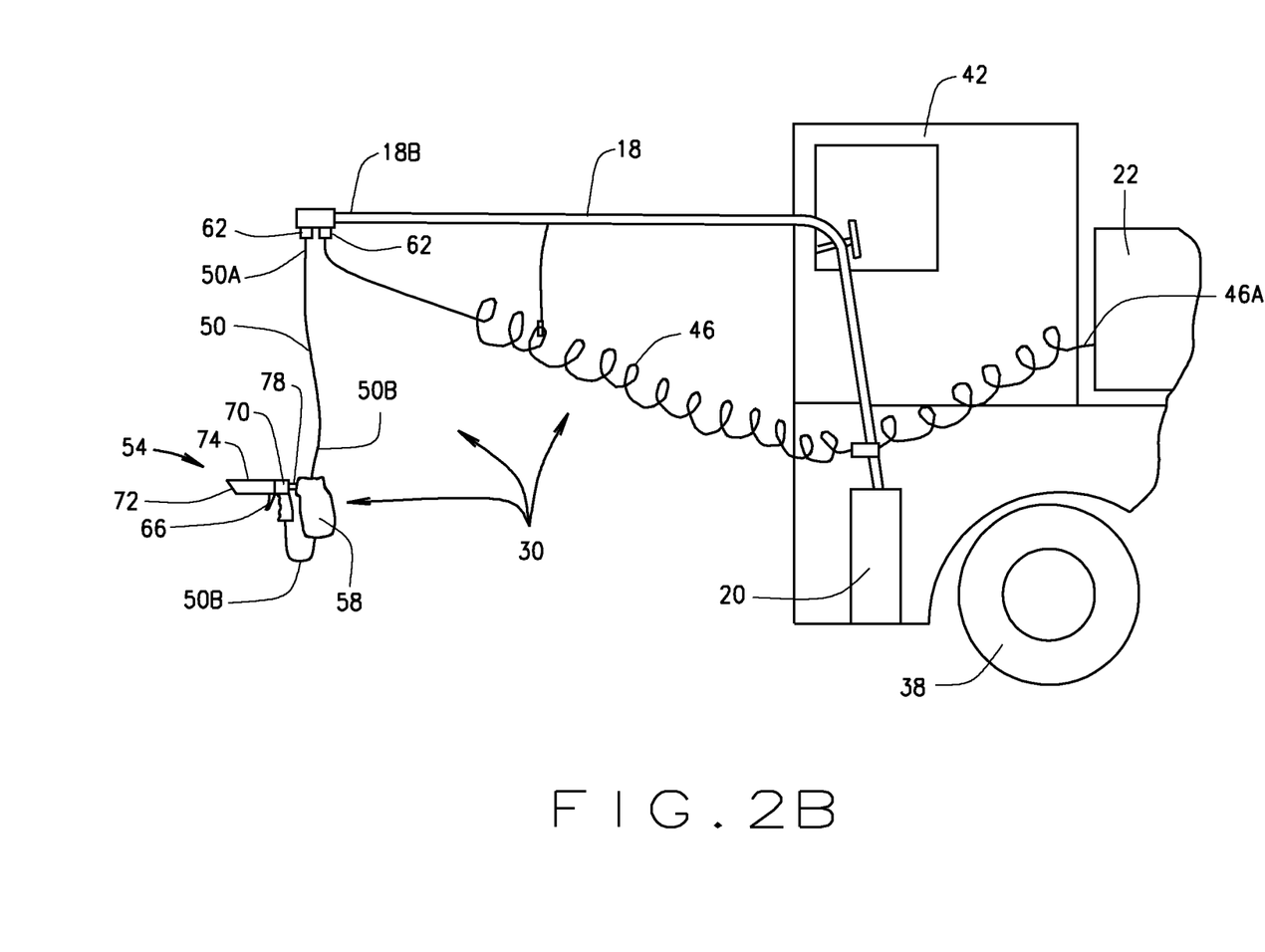
FIG. 2B is an illustration of an independent plant picker assembly of the high-throughput vacuum cotton harvesting system shown in FIG. 1A, in accordance with various other embodiments of the present disclosure.
Figure 2C:
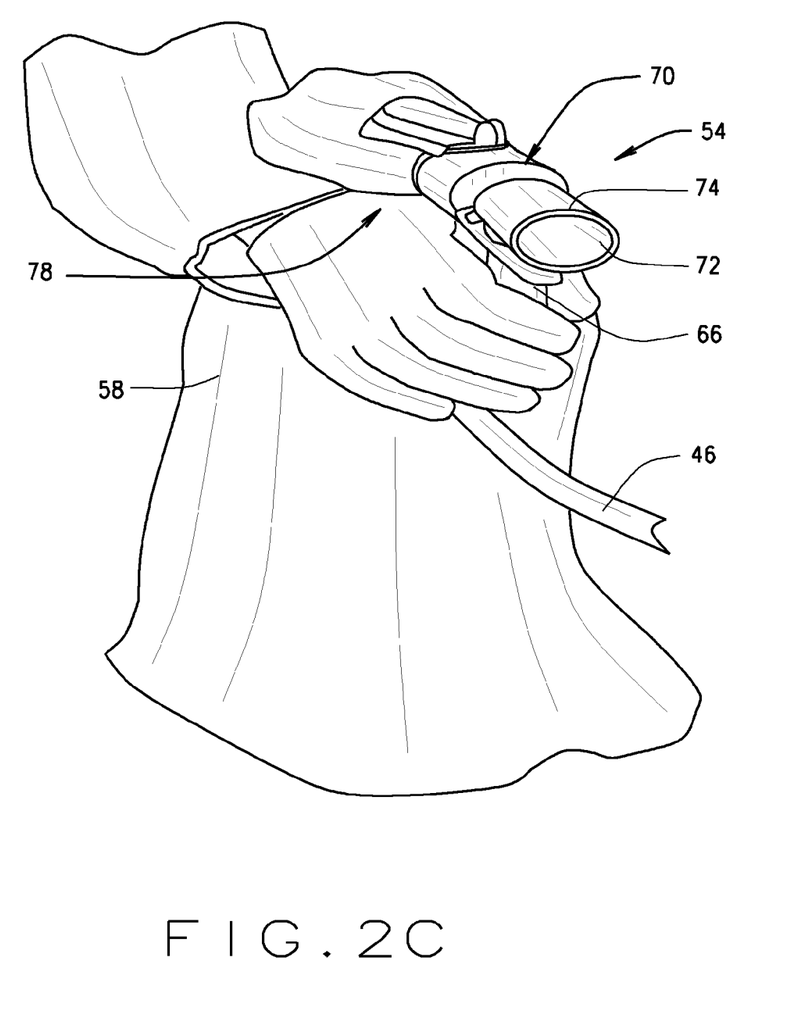
FIG. 2C is an illustration of a picker gun of the independent plant picker assembly shown in FIGS. 2A and 2B, in accordance with various embodiments of the present disclosure.

Referring now to FIGS. 2A and 2C, in various embodiments, each independent plant picker assembly 30 includes a respective one of the picker assembly hangers 18, the main vacuum generation supply hose or cord 46, a picker gun 54 and a single plant cotton boll collection receptacle 58. In various embodiments, each independent plant picker assembly 30 can additionally include the tether vacuum generation supply hose or cord 50. The main vacuum generation supply hose or cord 46 is fluidly connectable at a proximal end 46A to the centralized vacuum generation source 22 to provide a vacuum or a source for vacuum generation at a distal end 46B of the main vacuum generation supply hose or cord 46.

In various implementations, the main vacuum generation supply hose distal end 46B is removably connectable to the picker gun 54 via any suitable connection means or device, e.g., a pneumatic quick connector. Accordingly, when a picker gun 54 is connected to the respective vacuum generation supply hose or cord 46, pressurized air supplied by the centralized vacuum generation source 22 will flow through the vacuum generation supply hose or cord 46 and be delivered to the picker gun 54. When the system 10 is in operation, as described herein, one or more of the plurality of main air supply hoses 46 hanging from the picker assembly hangers 18 can have a picker gun 54 connected thereto for use by a respective one or more collectors/operators.

Each picker gun 54 includes a trigger 66 that is structured and operable to control the flow of the pressurized air through a vacuum mechanism or structure 70, e.g., a venturi, that comprises part of the picker gun 54, e.g., the vacuum mechanism 70 can be disposed internally within the picker gun 54 or mounted externally to the picker gun 54. The vacuum mechanism 70 utilizes the pressurized air to create a vacuum at a tip 72 of a nozzle 74 of the respective picker gun 54. More particularly, the vacuum is created such that the vacuum flows from the nozzle tip 72 and exits the nozzle 74 at a nozzle exhaust port 78.

In use, a respective collector/operator can place the nozzle tip 74 in contact with a cotton boll of a particular cotton plant and depress trigger 66 such that a vacuum is generated at the nozzle tip 72. The generated vacuum is of sufficient force to remove, i.e., extract, the cotton boll from the respective plant pod, transport the removed/extracted cotton boll through the nozzle 74 and expel the cotton boll from the exhaust port 78. The collector/operator can repeat this to remove/extract some or all of the cotton bolls from the respective cotton plant.

In various implementations, the single plant cotton boll collection receptacle 58, e.g., a collection bag, is removably connected to the nozzle exhaust port 78. Accordingly, all the removed/extracted cotton bolls will be collected in the single plant cotton boll collection receptacle 58. After a collector/operator has removed/extracted the desired number of cotton bolls from the respective plant, he/she can remove the single plant cotton boll collection receptacle 58 from the picker gun 54, mark the single plant cotton boll collection receptacle 58 with an identity label, e.g., a data matrix barcode and/or a digital image device and/or human readable text, to identify which plant the respective cotton bolls were collected from, attach a new empty single plant cotton boll collection receptacle 58 to the picker gun 54 and repeat the procedure for any desired number of cotton plants. Hence, a single collector/operator can collect and segregate the cotton bolls from a plurality of individual plants efficiently and at a high throughput. It is important to note that the identity label attached to the single plant cotton boll collection receptacle 58 by the collector/operator can be utilized to track the identity of the respective bolls, and particularly the seeds within the bolls, throughout transport from the collection point to other locations for subsequent processing or analysis, thus maintaining the genetic identity of each sample.

Referring now to FIGS. 2B, 2C and 6, in various implementations the main air supply hose distal end 46B can be fluidly connectable to a proximal end 50A of the tether supply hose 50, wherein the main air supply hose distal end 46B and the tether vacuum generation supply hose proximal end 50A are suspended from a distal end 18B of the respective picker assembly hanger 18. More particularly, each independent plant picker assembly 30 additionally includes a pair of fluidly connected hose or cord connector fittings 62, e.g., pneumatic quick connectors, disposed at the distal end 18B of the respective picker assembly hanger 18. In such implementations, one of the connector fittings 62 is structured to have the main air supply hose distal end 46B removably connected thereto and the other connector fitting 62 is structured to have the tether vacuum generation supply hose proximal end 50A removably connected thereto such that the main air supply hose distal end 46B and the tether vacuum generation supply hose proximal end 50A are fluidly connected to each other. Therefore, pressurized air supplied by the centralized vacuum generation source 22 will flow through the vacuum generation supply hose or cord 46 and then through the tether vacuum generation supply hose 50 such that pressurized air will be delivered to the distal end 50B of the tether vacuum generation supply hose 50. The centralized vacuum generation source 22 is structured and operable to simultaneously deliver air to the distal end 50B of each tether vacuum generation supply hose 50 at any desired pressure, e.g., 30 psi to 200 psi.

Further, in such implementations, the distal end 50B of the tether vacuum generation supply hose 50 is removably connectable to the picker gun 54 via any suitable connection means or device, e.g., a pneumatic quick connector. Accordingly, when a picker gun 54 is connected to the respective tether vacuum generation supply hose 50, pressurized air supplied by the centralized vacuum generation source 22 will flow through the vacuum generation supply hose or cord 46 and the tether vacuum generation supply hose 50 and be delivered to the picker gun 54. When the system 10 is in operation, as described herein, one or more of the plurality of tether vacuum generation supply hoses 50 hanging from the picker assembly hangers 18 can have a picker gun 54 connected thereto for use by a respective one or more collectors/operators. As described above, each picker gun 54 includes the trigger 66 that is structured and operable to control the flow of the pressurized air through the vacuum mechanism 70 to create a vacuum at the tip 72 of the nozzle 74 of the respective picker gun 54, whereafter the vacuum flows from the nozzle tip 72 and exits the nozzle 74 at the nozzle exhaust port 78.

As also described above, in use, a respective collector/operator can place the nozzle tip 74 in contact with a cotton boll of a particular cotton plant and depress trigger 66 such that a vacuum is generated at the nozzle tip 74. The generated vacuum is of sufficient force to remove/extract the cotton bolls from the respective plant pod, transport the removed/extracted cotton boll through the nozzle 72 and expel the cotton bolls from the exhaust port 78. The collector/operator can repeat this to remove/extract some or all of the cotton bolls from the respective cotton plant.

In various implementations, the single plant cotton boll collection receptacle 58, e.g., a collection bag, is removably connected to the nozzle exhaust port 78. Accordingly, all the removed/extracted cotton bolls will be collected in the single plant cotton boll collection receptacle 58. After a collector/operator has removed/extracted the desired number of cotton bolls from the respective plant, he/she can remove the single plant cotton boll collection receptacle 58 from the picker gun 54, mark the single plant cotton boll collection receptacle 58 with an identity label, e.g., a data matrix barcode and/or a digital image device and/or human readable text, to identify which plant the respective cotton bolls were collected from, attach a new empty single plant cotton boll collection receptacle 58 to the picker gun 54 and repeat the procedure for any desired number of cotton plants. Hence, a single collector/operator can collect and segregate the cotton bolls from a plurality of individual plants efficiently and at a high throughput. It is important to note that the identity label attached to the single plant cotton boll collection receptacle 58 by the collector/operator can be utilized to track the identity of the respective bolls, and particularly the seeds within the bolls, throughout transport from the collection point to other locations for subsequent processing or analysis, thus maintaining the genetic identity of each sample.

Figure 3A:
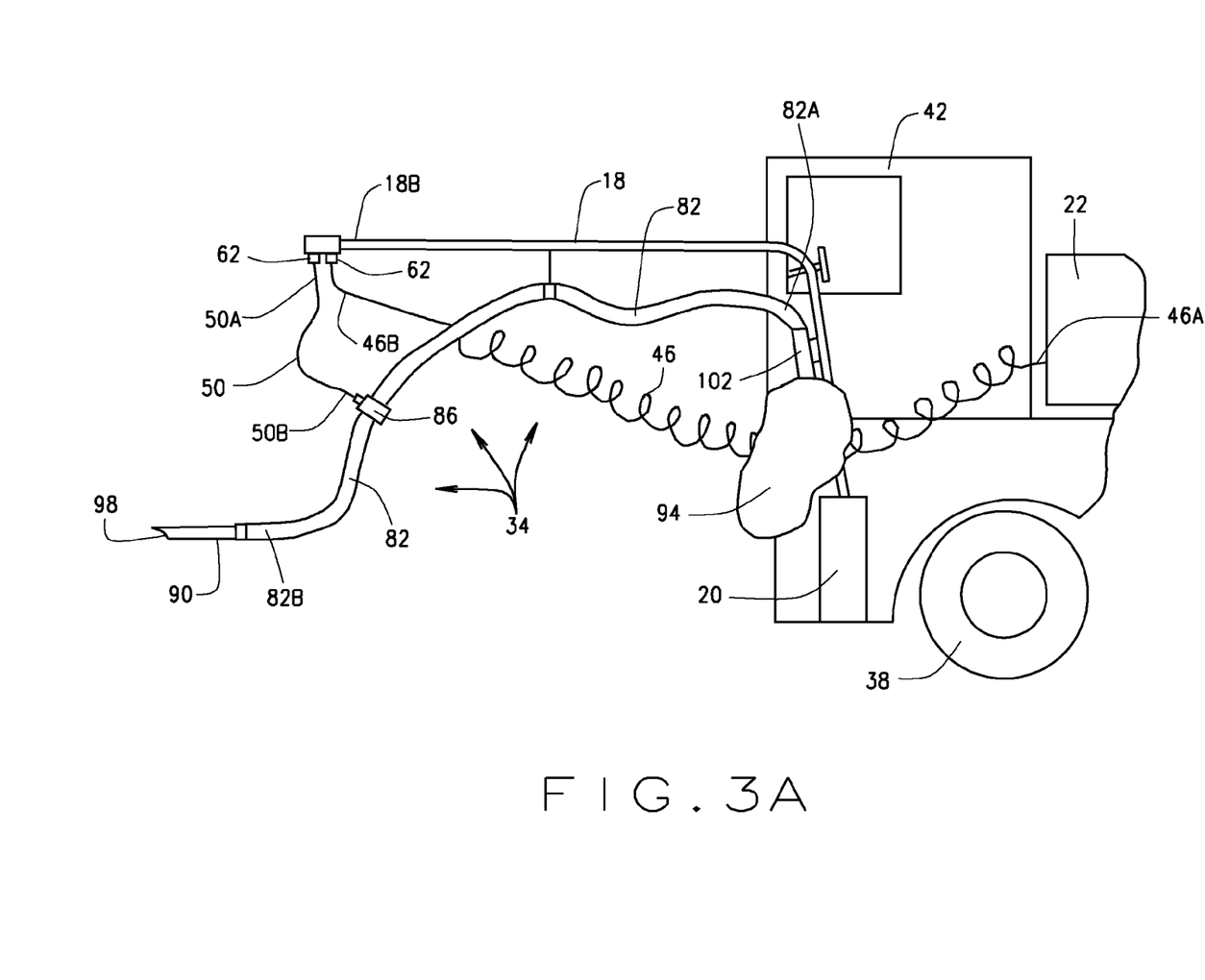
FIG. 3A is an illustration of a multiple plant picker assembly of the high-throughput vacuum cotton harvesting system shown in FIG. 1A, in accordance with various embodiments of the present disclosure.
Figure 3B:
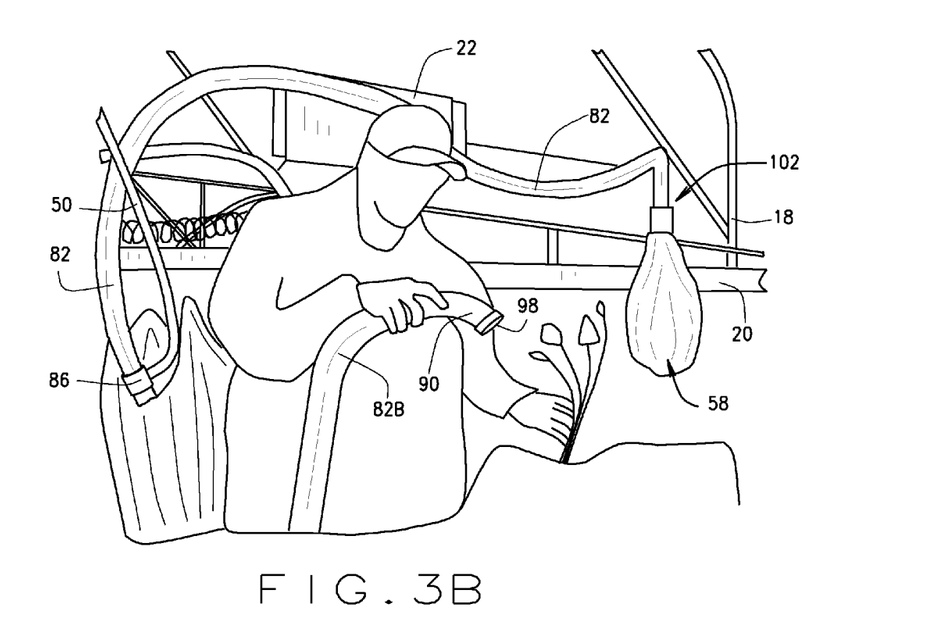
FIG. 3B is an illustration of a picker attachment of the multiple plant picker assembly shown in FIG. 3A, in accordance with various embodiments of the present disclosure.
Figure 3C:
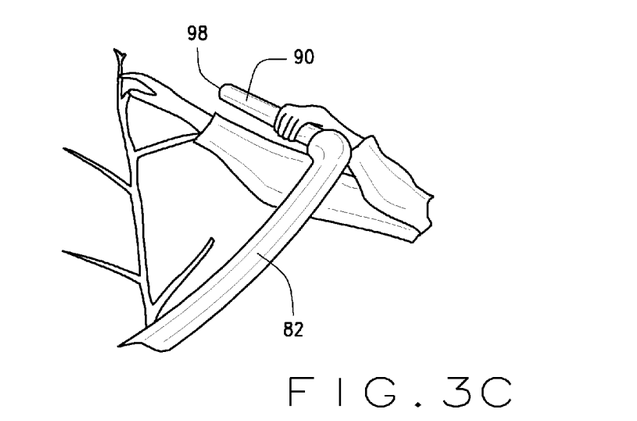
FIG. 3C is an illustration of a vacuum duct and picker nozzle of the picker attachment shown in FIG. 3B, in accordance with various embodiments of the present disclosure.

Referring now to FIGS. 3A, 3B and 3C, in various embodiments, each multiple plant picker assembly 34 includes the main vacuum generation supply hose or cord 46, the tether vacuum generation supply hose 50, a vacuum duct 82, an in-line vacuum generator 86, a picker nozzle 90, and a multiple plant cotton boll collection receptacle 94. As described above, in various embodiments, the main vacuum generation supply hose or cord 46 is fluidly connectable at the proximal end 46A to the centralized vacuum generation source 22 and can be fluidly connectable at the distal end 46B to the proximal end 50A of the tether supply hose 50 at the distal end 18B of the respective picker assembly hanger 18, via the hose connector fittings 62, e.g., pneumatic quick connectors.

As also described above, one of the connector fittings 62 is structured to have the main air supply hose distal end 46B removably connectable thereto and the other connector fitting 62 is structured to have the tether vacuum generation supply hose proximal end 50A connected thereto. Hence, the main air supply hose distal end 46B and the tether vacuum generation supply hose proximal end 50A are fluidly connectable to each other such that pressurized air supplied from the centralized vacuum generation source 22 will flow through the vacuum generation supply hose or cord 46 and the tether vacuum generation supply hose 50 and deliver pressurized air to the distal end 50B of the tether vacuum generation supply hose 50. The centralized vacuum generation source 22 is structured and operable to simultaneously deliver air to the distal end 50B of each tether vacuum generation supply hose 50 at any desired pressure, e.g., 30 psi to 200 psi.

In various embodiments, the in-line vacuum generator 86 is disposed in-line with the vacuum duct 82 such that air can flow through the entire length of the vacuum duct 82. The distal end 50B of the tether vacuum generation supply hose or cord 50 is removably connectable to the in-line vacuum generator 86 via any suitable connection means or device, e.g., a pneumatic quick connector. Accordingly, when the in-line vacuum generator 86 is connected to the respective tether vacuum generation supply hose or cord 50, pressurized air supplied by the centralized vacuum generation source 22 will flow through the vacuum generation supply hose or cord 46 and the tether vacuum generation supply hose or cord 50 and be delivered to the in-line vacuum generator 86. Each in-line vacuum generator 86 is structured and operable to utilize the pressurized air to create a vacuum at a tip 98 of the respective picker nozzle 90 that is connected to a distal end 82B of the vacuum duct 82. More specifically, the pressurized air provided by the centralized vacuum generation source 22 will create, via the in-line vacuum generator 86, a constant vacuum at the tip 98 of each respective picker nozzle 90. Moreover, a constant vacuum will be created, via the pressurized air delivered to the in-line vacuum generator 86, from the tip 98 of each respective picker nozzle 90 through the entire length of the vacuum duct 82 to an exhaust port 102 of the vacuum duct 82 at a proximal end 82A of the vacuum duct 82.

In use, a respective collector/operator can place the picker nozzle tip 98 in contact with a cotton boll of a particular cotton plant, whereby the vacuum generated by the in-line vacuum generator 86 will be applied to the cotton boll. The generated vacuum is of sufficient force to remove/extract the cotton boll from the respective plant pod, transport the removed/extracted cotton boll through the picker nozzle 90 and through the entire length of the respective vacuum duct 82 to the proximal end 82A. The cotton boll will then be expelled from the vacuum duct 82, via the exhaust port 102, into the multiple plant cotton boll collection receptacle 94.

In various implementations, the multiple plant cotton boll collection receptacle 94, e.g., a collection bag, is removably connected to the exhaust port 102 of the respective vacuum duct 82. The collector/operator can repeat this to remove/extract some or all of the cotton bolls from the respective cotton plant, then, continue the process on one or more other cotton plants to collect the cotton bolls from a plurality of cotton plants. Particularly, the removed/extracted cotton bolls from a plurality of plants will be collected in the multiple plant cotton boll collection receptacle 94. For example, each respective collector/operator can remove/extract the cotton bolls from a selected group of plants, an entire row of plants or a plurality of rows of plants and collect all the cotton bolls from the respective plurality of plants into the respective multiple plant cotton boll collection receptacle 94.

After a respective collector/operator has removed/extracted the desired number of cotton bolls from the desired number of plants, he/she can remove the multiple plant cotton boll collection receptacle 94 from the vacuum duct exhaust port 102, mark the multiple plant cotton boll collection receptacle 94 with an identity label, e.g., a data matrix barcode and/or a digital image device and/or human readable text, to identify which group of plants the respective cotton bolls were collected from, attach a new empty multiple plant cotton boll collection receptacle 94 to the vacuum duct exhaust port 102 and repeat the procedure for another selected plurality of cotton plants. Hence, one or more collectors/operators can collect and segregate the cotton bolls from a selected group of plants efficiently and at a high throughput. It is important to note that the identity label attached to the multiple plant cotton boll collection receptacle 94 by the collector(s)/operator(s) can be utilized to track the identity of the respective bolls, and particularly the seeds within the bolls, throughout transport from the collection point to other locations for subsequent processing or analysis, thus maintaining the genetic identity of each sample.

In various embodiments, two or more vacuum ducts from two or more multiple plant picker assemblies 34 can be connected to a single common exhaust port 102 such that the cotton bolls picked by two or more collectors/operators can be deposited into a single multiple plant cotton boll collection receptacle. Hence, one or more collectors/operators can collect the cotton bolls from a large number of plants at a single 'bulk' collection point efficiently and at a high throughput.

Figure 4:
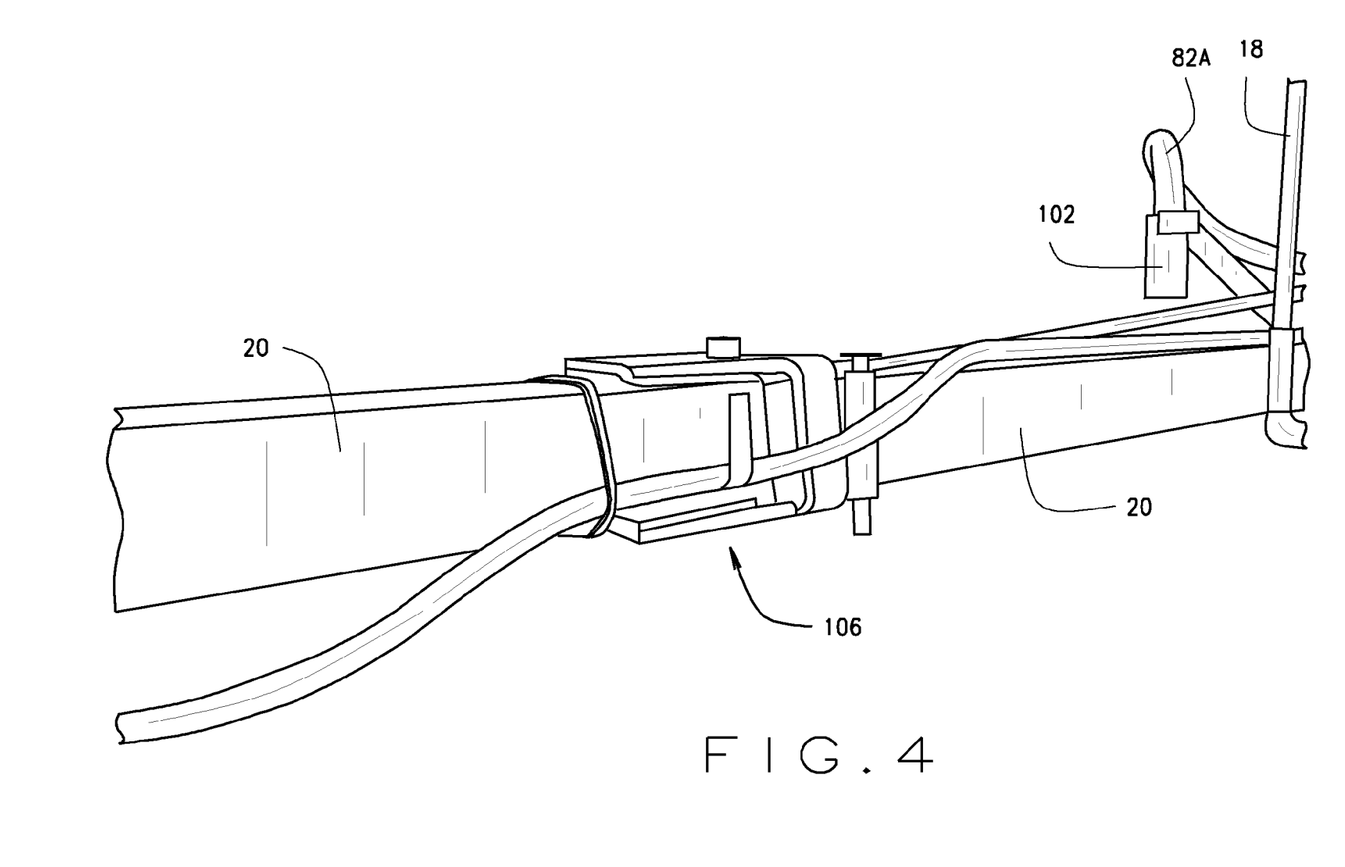
FIG. 4 is an illustration of a hinged joint of a hanger boom of the high-throughput vacuum cotton harvesting system shown in FIG. 1A, in accordance with various embodiments of the present disclosure.

Referring now to FIG. 4, in various embodiments, each hanger boom 20 can be pivotally connected to the mobile platform 14 at a proximal end and include a hinged joint 106 such that each hanger boom 20 can be collapsed or folded along the sides of the mobile platform when not in use.

Figure 5:
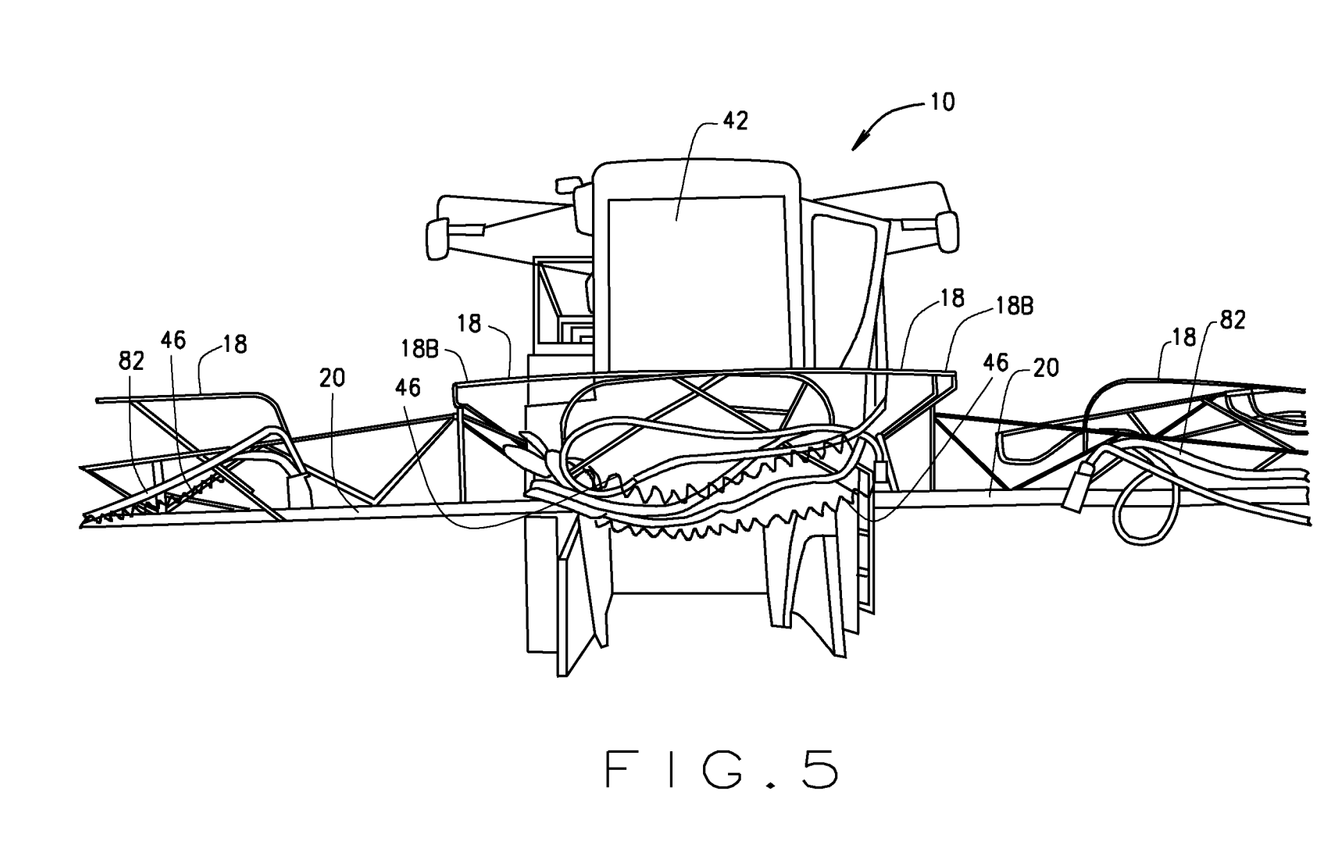
FIG. 5 is an illustration of a plurality of picker assembly hangers pivotally mounted to an opposing pair of the hanger booms of the high-throughput vacuum cotton harvesting system shown in FIG. 1A, in accordance with various embodiments of the present disclosure.

Referring now to FIG. 5, in various embodiments, each of the plurality of picker assembly hangers 18 is pivotally mounted to the respective hanger boom 20. More particularly, each picker assembly hanger 18 is pivotally mounted to the respective hanger boom such that the respective hanger distal end 18B can be moved in an arc substantially parallel to the ground. Accordingly, a user of the respective independent plant picker assembly 30 or multiple plant picker assembly 34 can move laterally, from side to side, with respect to the direction of travel of the mobile platform 14, as the mobile platform moves through a field.

Although the automated, self-propelled cotton harvesting system 10 is described above as including a single centralized vacuum generation source 22, it is envisioned that the system 10 can include a plurality of vacuum generation sources 22, e.g., a plurality of air compressors 22. For example, the system 10 can include a plurality of centralized vacuum generation source 22 such that each picker assembly hanger 18 has a respective one of the centralized vacuum generation sources 22 associated therewith. Therefore, the independent plant picker assembly 30 and multiple plant picker assembly 34 corresponding to each respective picker assembly hanger 18 will receive pressurized air, as described above, from the respective corresponding one of the centralized vacuum generation sources 22.

Or, alternatively, the system 10 can include two centralized vacuum generation source 22, e.g., two compressors, wherein each centralized vacuum generation source 22 services, i.e., provides pressurized air to, a respective side of the mobile platform 14. Accordingly, all the independent plant picker assemblies 30 and multiple plant picker assemblies 34 mounted to the hanger boom 20 on one side of the mobile platform 14 will receive pressurized air, as described above, from a first one of centralized vacuum generation source 22. And, similarly, all the independent plant picker assemblies 30 and multiple plant picker assemblies 34 mounted to the hanger boom 20 on the opposing side of the mobile platform 14 will receive pressurized air, as described above, from the second one of the centralized vacuum generation source 22.

Alternatively, as described above, in various embodiments, the one or more centralized vacuum generation source 22 can comprise and electrical generator and the main vacuum generation supply hoses or cords 46 and tether vacuum generation supply hoses or cords 50 can be electrical cords. In such embodiments, the main and tether vacuum generation supply hoses or cords 46 and 50 would be electrically connectable each other and to the one or more centralized vacuum generation source 22 as described above with regard to the embodiments wherein the one or more centralized vacuum generation source 22 comprises air compressors and the main and tether vacuum generation supply hoses or cords 46 and 50 comprise air hoses. In such electrical embodiments, the main and tether vacuum generation supply hoses or cords 46 and 50 would be electrically connectable each other and to the one or more centralized vacuum generation source 22 such that electrical current flows from the centralized vacuum generation source(s) 22 to the distal ends 46B and 50B as would be readily understood based on the description of the various air embodiments described above.

Furthermore, it is envisioned that in various embodiments, the automated, self-propelled cotton harvesting system 10 can include a guidance system (not shown) disposed within the mobile platform cab 42 to assist the driver of the mobile platform 14 in guiding the mobile platform 14 through the field. For example, in various embodiments, the system 10 can comprise a light bar guidance system that utilizes data received from visual sensors, e.g., cameras, infrared transceivers, sonic transceivers, or other suitable sensor or devices to indicate whether the mobile platform 14 is traveling substantially parallel to the rows of cotton plants having the wheels 38 tracking within the furrows between the rows of plants. In various implementations, such a light bar guidance system can include a processor disposed within the cab 42 that receives the guidance data from the sensors and in response thereto sends singles to a light bar mounted within the cab 42 to illuminate particular lights on the light bar base on how accurately the mobile platform 14 is traveling down the rows of plants. For example, the light bar can include one or more center green lights having a plurality of lateral red light on both sides of the center green light(s). In operation, if the mobile platform 14 is traveling straight down the rows of plants, i.e., the wheels 38 are staying in the furrows, the center green lights will be illuminated. However, if the mobile platform 14 starts to veer left, the lateral red lights on the left side of the center green light(s) will begin to illuminate, whereby the further left the mobile platform veers, the greater the number of lateral read lights that illuminate on the left side of the center green light(s) will be. Similarly, if the mobile platform 14 starts to veer right, the lateral red lights on the right side of the center green light(s) will begin to illuminate, whereby the further right the mobile platform veers, the greater the number of lateral read lights that illuminate on the right side of the center green light(s) will be.

Alternatively, in various embodiments, the automated, self-propelled cotton harvesting system 10 can include a global positioning system (GPS) to assist the driver of the mobile platform 14 in guiding the mobile platform 14 through the field. Moreover, in such embodiments, the GPS can be operable to monitor, track and/or guide the movement of the system 10 along the rows of plants in the field.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A high through-put cotton harvesting system for selectively harvesting cotton bolls from a plurality of cotton plants in a field, said system comprising:
    a self-propelled mobile platform structured and operable to be driven through a field of cotton;
    a plurality of plant picker assemblies hung from a plurality of picker assembly hangers pivotally mounted to and extending from each of one or more hanger booms connected to and laterally extendable away from the mobile platform such that each hanger boom is extendable over a plurality of rows of cotton plants in the field, each plant picker assembly structured and independently operable to utilize a vacuum force to extract cotton bolls from cotton plants in a respective one of the rows of plants over which the respective hanger boom extends as the mobile platform is driven through the field and deposit the extracted cotton bolls into one or more selected collection receptacles, via the vacuum force; and
    a vacuum generation source structured and operable to generate the vacuum force utilized by each of the plant picker assemblies.

2. The system of claim 1, wherein the plant picker assemblies comprise a plurality of independent plant picker assemblies and the selected one or more collection receptacles comprise a plurality of single plant cotton boll collection receptacles, each independent plant picker assembly comprising:
    a main vacuum generation supply hose connectable at a proximal end to the vacuum generation source;
    a picker gun connectable to a distal end of the main vacuum generation supply hose such that the vacuum force is provided at a nozzle of the picker gun, the picker gun structured and operable to utilize the vacuum force to selectively extract cotton bolls, via the vacuum force, from a plant in the field and draw the extracted cotton bolls into the nozzle; and
    at least one of the single plant cotton boll collection receptacles removably attached to the picker gun such that the extracted cotton bolls can be expelled from the picker gun into the single plant cotton boll collection receptacle.

3. The system of claim 1, wherein the plant picker assemblies comprise a plurality of multiple plant picker assemblies and the at least one selected collection receptacles comprise a plurality of multiple plant cotton boll collection receptacles, each multiple plant picker assembly comprising:
    a main air vacuum generation supply hose connectable at a proximal end to the vacuum generation source;
    a tether vacuum generation supply hose connectable at a proximal end to a distal end of the main vacuum generation supply hose;
    a vacuum duct connectable at a proximal end to a vacuum duct exhaust port of the respective multiple plant picker assembly;
    a picker nozzle connectable to a distal end of the vacuum duct;
    a vacuum generator disposed in-line within the vacuum duct and connectable to a distal end of the tether vacuum generation supply hose such that the vacuum force is generated at a tip of the picker nozzle such that a plurality of cotton bolls can be extracted, via the vacuum force, from a plurality of plants in the field, transported through the vacuum duct and expelled from the vacuum duct exhaust port into at least one of the multiple plant cotton boll collection receptacles removably attached to the vacuum duct exhaust port.

4. The system of claim 1, wherein each hanger boom is pivotally connected to the mobile platform and comprises a hinged joint such that each hanger boom is collapsible to be disposed along sides of the mobile platform.

5. The system of claim 1, wherein each picker assembly hanger is pivotally mounted to the respective hanger boom and is structured and operable to support and suspend selected components of a respective one of the plant picker assemblies over a respective one of the plurality of rows of plants such that each picker assembly can be utilized extract the cotton bolls from the one or more cotton plants in a respective one of the plurality of rows of plants.

6. The system of claim 1, wherein each hanger boom is connectable to a support structure extending from a rear of the mobile platform, each hanger boom structured and operable to support and position the plant picker assemblies such that each picker assembly can be utilized to extract the cotton bolls from the one or more cotton plants in a respective one of the plurality of rows of plants.

7. A method for selectively harvesting cotton bolls from a plurality of cotton plants in a field, said method comprising:
hanging a plurality of plant picker assemblies from a plurality of picker assembly hangers pivotally mounted to and extending from each of one or more hanger booms connected to and laterally extendable away from a self-propelled mobile platform of a high through-put cotton harvesting system such that each hanger boom is extendable over a plurality of rows of cotton plants in the field such that selected components of each plant picker assembly are provided for use at a respective one of the plurality of rows of cotton plants over which the respective hanger boom extends;
providing a vacuum to a nozzle of each plant picker assembly utilizing a vacuum generation source connected to the mobile platform;
utilizing the vacuum force provided at the nozzle of each plant picker assembly to extract cotton bolls from the cotton plants in the respective row over which the respective hanger boom extends as the mobile platform is driven through the field; and
depositing the extracted cotton bolls into at least one selected collection receptacle, via the vacuum force.

8. The method of claim 7, wherein hanging the plurality of plant picker assemblies comprises hanging a plurality of independent plant picker assemblies from the picker assembly hangers, wherein each independent plant picker assembly comprises a main vacuum generation supply hose connectable at a proximal end to the vacuum generation source, a picker gun connectable to a distal end of the main air supply hose and a single plant cotton boll collection receptacle removably attached to the picker gun.

9. The method of claim 8, wherein utilizing the vacuum force provided at the nozzle of each plant picker assembly to extract cotton bolls from the cotton plants in the respective row over which the respective hanger boom extends comprises:
selectively extracting cotton bolls, via the vacuum force, from a plant in the respective row and drawing the extracted cotton bolls into the nozzle; and
expelling the extracted cotton bolls from the nozzle into the at least one single plant cotton boll collection receptacle.

10. The method of claim 7, wherein hanging the plurality of plant picker assemblies comprises hanging a plurality of multiple plant picker assemblies from the picker assembly hangers, wherein each multiple plant picker assembly comprises a main vacuum generation supply hose connectable at a proximal end to the vacuum generation source, a tether vacuum generation supply hose connectable at a proximal end to a distal end of the main vacuum generation supply hose, a vacuum duct connectable at a proximal end to a vacuum duct exhaust port of the respective multiple plant picker assembly, a vacuum generator disposed in-line within the vacuum duct and connectable to a distal end of the tether vacuum generation supply hose, the nozzle connectable to a distal end of the vacuum duct, and a multiple plant cotton boll collection receptacle removably attached to the vacuum duct exhaust port.

11. The method of claim 10, wherein utilizing the vacuum force provided at the nozzle of each plant picker assembly to extract cotton bolls from the cotton plants in the respective row over which the respective hanger boom extends comprises:
selectively extracting a plurality of cotton bolls, via the vacuum force, from a plurality of plants in the respective row and transporting the extracted cotton bolls through the vacuum duct, via the vacuum force;
expelling the extracted cotton bolls from the vacuum duct into the multiple plant cotton boll collection receptacle.

12. The method of claim 7, wherein hanging the plurality of plant picker assemblies further comprises:
supporting and suspending selected components of each respective plant picker assemblies from a respective one of the picker assembly hangers such that the selected components are suspended over a respective one of the plurality of rows of plants; and
utilizing each respective plant picker assembly to extract the cotton bolls from the one or more cotton plants in the respective one of the plurality of rows of plants.

13. The method of claim 7, wherein hanging the plurality of plant picker assemblies comprises:
extending each one hanger boom from a rear of the mobile platform; and
utilizing each hanger boom to support and position the plant picker assemblies such that each picker assembly can be utilized to extract the cotton bolls from the one or more cotton plants in a respective one of the plurality of rows of plants.

14. A high through-put cotton harvesting system for selectively harvesting cotton bolls from a plurality of cotton plants in a field, said system comprising:
a self-propelled mobile platform structured and operable to be driven through a field of cotton;
a plurality of plant picker assemblies hung from a plurality of picker assembly hangers pivotally mounted to and extending from each of one or more hanger booms pivotally connected to and laterally extendable away from the mobile platform such that each hanger boom is extendable over a plurality of rows of cotton plants in the field,
each plant picker assembly structured and independently operable to utilize a vacuum force to extract cotton bolls from cotton plants in a respective one of the rows of plants over which the respective hanger boom extends as the mobile platform is driven through the field and deposit the extracted cotton bolls into one or more selected collection receptacles, via the vacuum force, and each hanger boom comprising a hinged joint such that each hanger boom can be folded along sides of the mobile platform when not in use; and a vacuum generation source structured and operable to generate the vacuum force utilized by each of the plant picker assemblies.

15. The system of claim 14, wherein the plant picker assemblies comprise a plurality of independent plant picker assemblies and the selected one or more collection receptacles comprise a plurality of single plant cotton boll collection receptacles, each independent plant picker assembly comprising:

a main vacuum generation supply hose connectable at a proximal end to the vacuum generation source;

a picker gun connectable to a distal end of the main vacuum generation supply hose such that the vacuum force is provided at a nozzle of the picker gun, the picker gun structured and operable to utilize the vacuum force to selectively extract cotton bolls, via the vacuum force, from a plant in the field and draw the extracted cotton bolls into the nozzle; and at least one of the single plant cotton boll collection receptacles removably attached to the picker gun such that the extracted cotton bolls can be expelled from the picker gun into the single plant cotton boll collection receptacle.

16. The system of claim 14, wherein the plant picker assemblies comprise a plurality of multiple plant picker assemblies and the at least one selected collection receptacles comprise a plurality of multiple plant cotton boll collection receptacles, each multiple plant picker assembly comprising:

a main air vacuum generation hose connectable at a proximal end to the vacuum generation source;

a tether vacuum generation supply hose connectable at a proximal end to a distal end of the main vacuum generation supply hose;

a vacuum duct connectable at a proximal end to a vacuum duct exhaust port of the respective multiple plant picker assembly;

a picker nozzle connectable to a distal end of the vacuum duct;

a vacuum generator disposed in-line within the vacuum duct and connectable to a distal end of the tether vacuum generation supply hose such that the vacuum force is generated at a tip of the picker nozzle such that a plurality of cotton bolls can be extracted, via the vacuum force, from a plurality of plants in the field, transported through the vacuum duct and expelled from the vacuum duct exhaust port into at least one of the multiple plant cotton boll collection receptacles removably attached to the vacuum duct exhaust port.

17. The system of claim 14, wherein each picker assembly hanger is pivotally mounted to the respective hanger boom and is structured and operable to support and suspend selected components of a respective one of the plant picker assemblies over a respective one of the plurality of rows of plants such that each picker assembly can be utilized extract the cotton bolls from the one or more cotton plants in a respective one of the plurality of rows of plants.

* * * * *